April 30, 1968 — J. YOUHOUSE — 3,381,109

ELECTRIC CIGAR LIGHTER

Filed Jan. 3, 1966

INVENTOR.
JOSEPH YOUHOUSE
BY
Lloyd␣J.␣Andres

3,381,109
ELECTRIC CIGAR LIGHTER
Joseph Youhouse, 4885 SW. 118th Ave.,
Miami, Fla. 33165
Filed Jan. 3, 1966, Ser. No. 518,240
8 Claims. (Cl. 219—265)

ABSTRACT OF THE DISCLOSURE

An electric cigar lighter for use in the electric system of a vehicle in which the heating element in the lighter is energized for a short period by the current through a series connected current responsive thermostat when the lighter is manually operated.

---

This invention relates in general to electric cigar lighters and more particularly to a manually operated rapid heating lighter with automatic thermostatic control therefor.

Cigar lighters prior to this invention were of two general types. A first required two operations for use, namely, the inward movement of the lighter device for detent engagement and energizing including a thermal release of the detent means for releasing the device for use. This type is complicated and expensive to manufacture, and subject to failure when subject to frequent use and the attendant high temperatures. A second type requires the operator to push the lighter into its socket for energizing the element and holding same in the inward position until the element is heated to a temperature sufficiently high for use. This type has been generally unsatisfactory because of the eight to twelve seconds required for heating and the relatively short life when held in energized position for an excessive period of time, and limiting the life of the heater element.

The present invention overcomes the above objections and disadvantages by the provision of an electric lighter of relatively low manufacturing cost, which is basically of the aforesaid second type which requires the user to depress same for energizing, but with the distinct advantage of an extremely short heating time including a snap action self-heating thermostat for protecting the heating element from overheating when the device is held in heated position for excessively long periods of time, the construction of which is a principal object of the invention.

Another object of the invention is the construction of a heater element of conical-spiral shape partially imbedded in a felt-like ceramic for greatly extending the useful life of the element.

Another object of the invention is the provision of a quick heating electric heater element under the control of a snap-action self-heating thermostat for controlling and preventing excessive heating when held energized.

Another object of the invention is the provision of an electric heater control thermostat having a flat spiral-shaped bi-metal element for operating an electric contact and having predetermined electric conductivity through two paths for rapid snap action from an on to an off position and vice versa when retained in a spring cradle.

These and other objects and advantages in one embodiment of the invention are described and shown in the following specification and drawing, in which.

Figure 1:
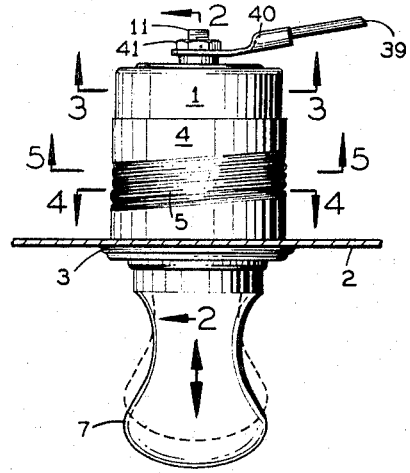
FIG. 1 is a side view of the cigar lighter assembly as mounted in the panel of a vehicle.
Figure 2:
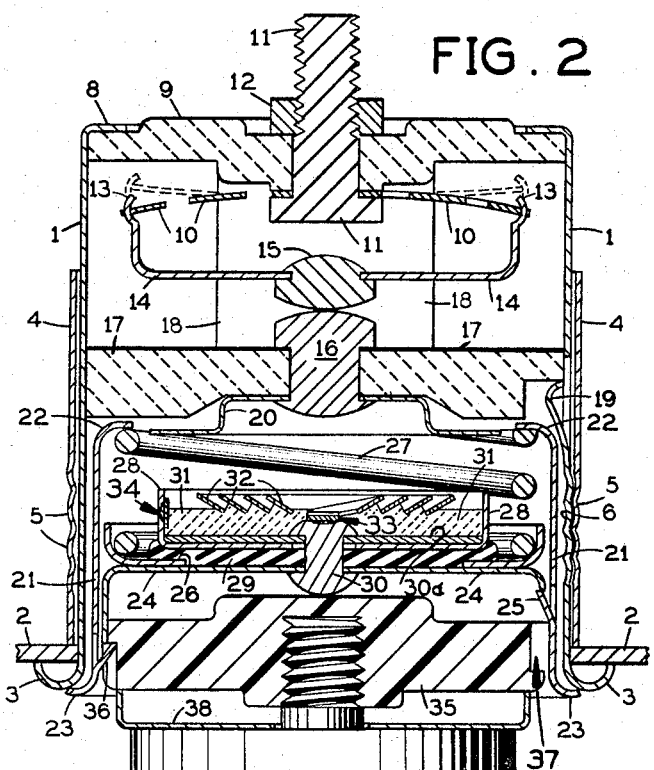
FIG. 2 is an enlarged cross sectional view taken through section line 2—2, FIG. 1, with elements in de-energized position.

Referring to FIGS. 1 and 2, a socket assembly 1 for the lighter, commonly called a "well," is retained in a circular hole in a panel 2 by an integral circumferential divergent rim 3 around the forward end of the well and bearing against the outside surface of panel 2 with a cylindrical collar 4 retained on the outer periphery of the well having a rolled thread thereon frictionally engaged with mating portions of threads formed in lanced areas of the periphery of the well 1. The inner edge of collar 4 will bear against the inner side of the panel 2, and secure the well, as shown, when forcibly threaded thereon. A conventional coaxial knob 7 is provided for the convenient manual removal of the lighter assembly by the fingers.

Figure 3:
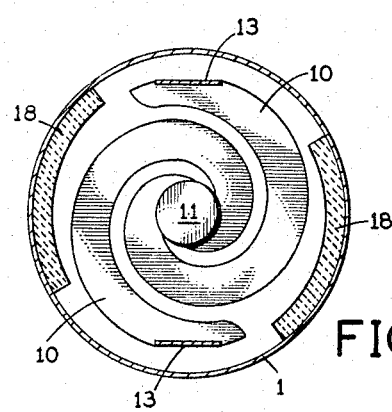
FIG. 3 is an enlarged cross sectional view taken through section line 3—3, FIG. 1.

Referring to FIG. 2, the inner end of the well 1 is formed into a convergent flange 8 for retaining a circular thermostat base 9, made of ceramic material, such as "Alsimag," positioned within the lower end of the well, as shown. A dual spiral shaped bi-metal element 10—10, of predetermined resistivity, better shown in FIG. 3, is centrally secured to base 9 by a screw 11 and a nut 12. The shank of screw 11 is square and fitted into a mating square hole centrally through element 10—10 and base 9 for preventing rotation of the screw when the nut 12 is tightened.

The opposite outer ends of the dual bi-metal element are notched to be retained in the grooved ends 13 of a U-shaped spring cradle member 14, of uniform width, preferably made from "Berylco" alloy, which retains an electric contact 15, preferably made of silver alloy, centrally swaged therein, thus providing a parallel electric circuit through both spiral legs of the bi-metal element of predetermined resistance from screw 11 to contact 15. The cradle spring member 14 normally urges the bi-metal element 10 under stressed condition in the curved position shown in FIG. 2 for resisting movement through a wide range of ambient temperatures when the lighter is idle.

A mating electric contact 16 is centrally retained in a second ceramic disc 17, which is spaced from base 9 by a pair of legs 18 integral with base 9 and straddling and clearing the member 14, which in addition to retaining contact 16 thermally isolates the bi-metal member 10—10 from the heater, to be hereinafter described. One of the legs 18 is shown in FIG. 2. The disc 17 is retained in its operative position by three projections 19 lanced inward 120 degrees apart from and around well 1, one of which is shown in FIG. 2, and engaging and retaining disc 17 in appropriate recesses, better shown in FIG. 5.

Figure 5:
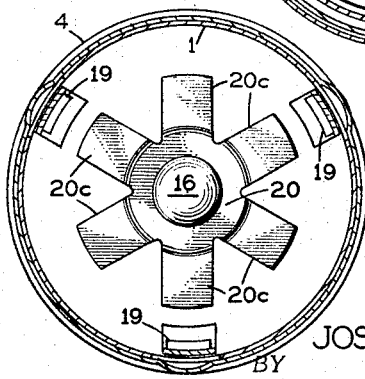
FIG. 5 is an enlarged cross sectional view taken through section line 5—5, FIG. 1.

A heater contact plate 20, having six co-planar radial blades 20c, better shown in FIG. 5, to insure a low resistance electric conduction, is retained against the outer side of disc 17 by the swaged electric contact 16.

It is now apparent from FIG. 2 that the base 9 and the disc 17 may be readily assembled and secured into their operative positions, as shown, by forceful axial insertion into the outer end of the well 1 by snapping over projections 19.

Figure 6:
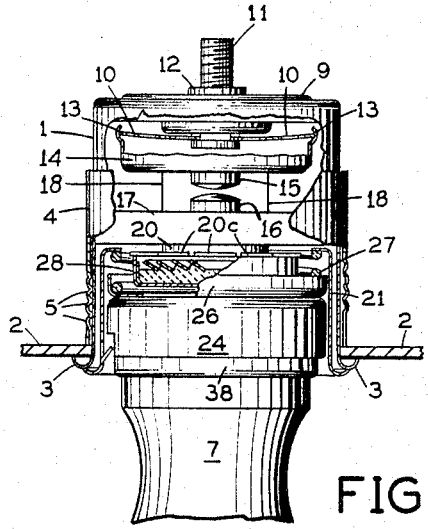
FIG. 6 is a fragmentary side view of the lighter shown in FIG. 1 with a portion thereof broken away showing the elements therein when held in energized position and the thermostat therein in operated position.

It is to be noted that the temperature of the bi-metal member 10—10 is raised to an operative level by the current consumed in the heater element to which it is series connected. Thus, when the heater element has reached a desired red heat, the thermostat will also be heated by the series current sufficient whereby the cradle member will move to an expanded position and permit the bi-metal element to snap into opposite position, shown in dotted lines, and thus simultaneously rapidly break the engagement of contacts 15 and 16, as shown in FIG. 6. The breaking of the electric circuit then permits the bi-metal member 10—10 to cool to a predetermined lower, but still useful temperature at which time it will snap back to its initial idle position with the contacts 15 and 16 closed for the simultaneous re-energizing of both a lighter unit and the bi-metal element.

Again referring to FIG. 2, the removable lighter unit comprises a cylindrical housing shell 21 having an inward convergent flange 22 around the inner periphery thereof and an outer divergent flange 23 serving as a stop for axially positioning the lighter assembly within the well 1. A cup-shaped heater guide member 24 is slidably retained in the housing 21 by three projections 25 serving as outward stops lanced into and around the wall of the housing 120 degrees apart, one of which is shown. A cup-shaped spring retainer 26 is coaxially positioned and secured adjacent to member 24 and serves to retain the lighter return spring 27 in the position shown around the inside edge of flange 22, as shown. The spring 27 is preferably made from heat and corrosion resistant material, such as "Berylco" alloy.

A heater cup 28 is positioned in coaxial spaced relation to member 24 by a disc 29 formed of compressed fibrous ceramic.

It is to be noted that the cup 28 has a central hole therethrough considerably larger than the diameter of the rivet 30 and a mica washer 30a is positioned on the inner side of the cup for firmly retaining the inner head of rivet 30. Thus the heater cup 28 is electrically and thermally insulated from guide member 24 and the outer shell 21, which is conductive to panel 2.

The heater cup 28 is partially filled with a fibrous felt ceramic, forming a heater bonding insulator 31, preferably of the type known as "Fiberfrax."

Figure 4:
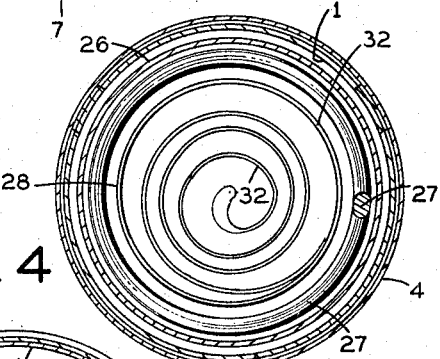
FIG. 4 is an enlarged cross sectional view taken through section line 4—4, FIG. 1.

The heater element 32, also shown in FIG. 4, is formed from flat ribbon of resistance wire of uniform cross section, such as a "Kanthol" alloy, formed into a planar spiral shape with each turn thereof positioned in a conical relation at a predetermined angle to the axis of rivet 30 and partially imbedded in the fibrous material 31, which will retain non-shorting spacing between the turns of the heater element and forming a coil highly resistant to both mechanical and thermal displacement of deformation. The inner end of the heater element is welded to the rivet 30 at 33 and the outer end thereof welded to the shell 28 at 34, as illustrated.

A cylindrical outer knob base 35, preferably molded from a thermo setting plastic, such as a phenolic plastic, is fitted within support member 24 and retained therein by three inward lanced projections 35 spaced apart at 120 degrees around the periphery of member 24. It is to be noted that there are three clearance pockets 37 positioned around the periphery of base 35 for clearance of projections 25 when the base 35 is depressed in an axial direction. The lighter is manually operated by a coaxial knob member 7 spaced from base 35 by a collar 38 and secured thereto by a threaded end thereof. It is obvious that the knob can be made of a wide variety of materials best suited to its environment.

In order that the lighter may be frictionally retained in the well, and a low resistance contact made between the shell 21 and the well, a plurality of tongues, not shown, are lanced outward from the shell for frictionally engaging the inner wall of the well. It is to be noted that the spring 27 will exert a sufficient force to return all elements secured to the knob when moved inward within shell 21, as shown in FIG. 2.

The complete lighter assembly, shown in FIG. 1, assumes the panel 2 is connected to one side of the battery of the vehicle, commonly called the "ground." The conductor 39 is connected to the opposite side of the battery through conventional vehicle circuitry and terminates in a terminal 40 secured to screw 11 by a nut 41.

In operation and when knob 7, shown in FIG. 1, is moved from the position shown in solid lines to the position shown in dotted lines, the base 35 will then move the total asesmbly of guide member 24, spring retainer 26, mica spacer disc 29 and the cup 28 within housing 21 inward until the edge of shell 28 will contact the six blades 20c of the heater contact 20 against the restraining action of return spring 27. This will complete an electric circuit between screw 11, the thermostat element, contacts 15 and 16, heater element 32, member 24 and housing 21 and well 1 to panel 2. Thus, the heater element 32 conducting a relatively high current will be rapidly energized to a red heat and the lighter is ready for withdrawal from the well for use; simultaneously the bi-metal element will be heated by the current through the series heater circuit and cause same to move the contacts to their open position de-energizing both the heater and thermostat element in the event the lighter unit is held in energized position. Normally the lighter unit will be removed from the well before the thermostat has had sufficient time to snap to its open position.

Under the parameters of proper design the average twelve volt battery in a vehicle will raise the heater element to useful red heat within approximately two seconds, however, when the vehicle engine is running and te generator is supplying slightly higher voltage for the battery charge, the heater element will rise to useful red heat in approximately one second.

In the event the knob 7 is moved and held into energized position for a period of approximately two or more seconds then the bi-metal element 10—10 of the thermostat will be heated to its critical temperature and flex over the center by the action of cradle member 14 and open the contacts 15 and 16 and de-energize the heater element 32, for a predetermined cooling period, thus protecting the heater element and its associated parts and reducing the corresponding battery drain.

In the event the lighter is held in energized position over a protracted period, the bi-metal thermostat will sequentially cycle at approximately ten to twelve cycles per minute and protect both the lighter and the associated elements, and during the above period the heater element will be maintained in useful red condition.

It is to be noted that the spring 27 serves a dual purpose of returning the lighter to its normal idle position against the restraining action of friction and also serves as a low resistance conductor for carrying current from the spring retainer 26 directly to the heater element housing shell 21. The relative quick heating and high efficiency of the lighter is largely due to the compound radiant heat action of the spiral-conical form of element retained in the fibrous ceramic which confines the radiation and permits inter-radiation between each turn of the element, and in addition, the spiral conical element reinforced by the fibrous ceramic provides high resistance to mechanical dislocation and deformation.

It is to be noted that conventional cigar lighters operated from a twelve volt battery consume approximately ninety-six watts and require an energizing period of approximately ten seconds to produce a useful red heat resulting in a total power consumption for each proper operation thereof of approximately 960 watt seconds.

In sharp contrast to the above, the present invention utilizing the aforesaid construction when operated from a twelve volt battery will consume approximately 240 watts when energized, however, since the time period for obtaining useful red heat is approximately one second, the total power consumption for each operation is approximately 240 watt seconds.

It is understood that certain modifications in the construction, utilizing the features above described, are intended to come within the scope of the appended claims.

Having described my invention, I claim:

1. An electric cigar lighter comprising a means forming an electric conducting cylindrical well means adapted and constructed for fixed mounting, an electric thermostat means positioned in said well means including a pair of contacts for movement from a closed to an open circuit positioned at a first and second predetermined low and high temperature respectively with one of said contacts conductively secured to a heater energizing member in said well means insulated therefrom and facing the front open end thereof and the other said contact connected to an external electric terminal, a lighter unit adapted and constructed for frictional retention in said well means and for complete manual removal for use, said unit having an electric conducting outer shell adapted and constructed for insertion into said well means a predetermined distance, an electric conducting heater retaining means slidably positioned in said shell for axial movement from an outer idle to an inner energizing position, spring means biased between said shell and said retaining means for urging the latter into said idle position, a heater element formed of ribbon of uniform cross section and predetermined resistivity in a planar spiral form having each turn in predetermined spaced relation and in predetermined conical position with respect to the axis thereof, a heater cup secured to and insulated from said retaining means by dielectric means and positioned in spaced relation substantially coaxial and normal to said axis, said heater element positioned substantially coaxial in said cup substantially normal to said axis with the inner end thereof connected to said retaining means and the outer end thereof connected to said cup, a dielectric base member slidably positioned in the outer end of said shell for predetermined axial movement therein, a predetermined source of electric energy including a circuit means therefrom connecting said well means and said terminal, knob means secured to said base member for manually moving the latter inward and for removing the lighter unit from said well means whereby the inward movement of said knob means will move said cup into contact with said energizing member for completing said circuit means through said well means and said outer shell and said retaining means and said heater element and said cup and through said thermostat to said energizing terminal for heating said heater element and said thermostat and whereby the energizing of said heater element a predetermined sustained period will heat and actuate the thermostat means by the current therethrough and open said contacts and de-energize said heater element for a predetermined period of time.

2. The construction recited in claim 1 including a fibrous ceramic refractory retained in said cup with an inner portion of each turn of said heater element imbedded therein.

3. The construction recited in claim 1 including said energizing member formed into a plate having a plurality of radial blades positioned substantially normal to said axis for providing low resistance multiple electric contacts to said heater cup when the latter is moved into contact with said blades.

4. In a cigar lighter of the character described a means forming a tubular cylindrical well adapted and constructed for fixed mounting, an electric thermostat means positioned in said well comprising a dielectric body secured in the inner end of said shell, a generally spiral shaped bi-metal element retained on the inner side of said body by a conducting stud means centrally through said element with the plane thereof positioned substantially normal the axis of said well and extending through said body in coaxial relation with said well and forming an external energizing terminal, a U-shaped spring cradle having a pair of opposite legs formed to pivotally engage opposite notched edges of said bi-metal element and normally holding the latter bowed in outward direction under ambient temperature conditions and including an outward facing first electric contact centrally secured therein, a ceramic disc retained in said well normal said axis in spaced relation to said base with a fixed second contact centrally retained therein in coaxial relation and normally engaging said first contact with the outer end of said second contact retaining an energizing plate for a lighter means when engaged therewith whereby said bi-metal element will overcome the spring tension of said cradle and snap into opposite bowed position by said cradle and disengage said first and second contacts when the temperature of said bi-metal element is raised to a predetermined degree by the flow of a predetermined electric current therethrough when said bi-metal element is connected in a predetermined electric circuit.

5. The construction recited in claim 4 including a pair of support members integral with said base and straddling said cradle in spaced relation therewith with the ends thereof positioned against the inner surface of said disc with the outer side thereof retained by engagement with a plurality of projections lanced inward in spaced relation around said well.

6. In a lighter unit of the character described a means forming a tubular cylindrical well means adapted and constructed for fixed mounting, an energizing plate secured in said well means in fixed relation therewith and insulated therefrom, a lighter unit adapted and constructed for frictional retention in said well means and for complete manual removal for use, said lighter unit having a sheet metal cylindrical shell, a sheet metal cup-shaped heater support member slidably retained by the outer surface thereof in said shell for axial movement from an idle to an energized position, spring means biased between said shell and said support member for urging the latter into said idle position, a sheet metal heater cup positioned in coaxial spaced relation with respect to said support member and insulated therefrom by a heat resistant dielectric disc and retained thereon by a central fastener and insulated therefrom by a heat resistant dielectric washer positioned against the inner surface of said cup with said fastener conductively secured to said support member with the rim of said cup providing a circular contact normal the axis of said shell, said cup partially filled with a heat resistant fibrous ceramic insulation, a heater element of metal alloy ribbon of uniform cross section and predetermined resistivity in spaced planar spiral shape with each turn thereof formed at a predetermined conical angle with respect to said axis, said heater element positioned in said cup normal said axis with each said turn imbedded in said fibrous insulation and the inner end thereof connected to said central fastener and the outer end thereof connected to said cup, a manual knob means slidably retained in said shell for axially engaging and moving said support member into said energized position against the restraining action of said spring means with said circular contact engaging said energizing plate whereby said heater element will be energized to a predetermined useful temperature within a predetermined time when said well means and said energizing plate are connected to a predetermined source of electric energy and said knob means is manually depressed.

7. An electric cigar lighter comprising a means forming an electric conducting cylindrical well adapted and constructed for fixed mounting, an electric bi-metal element thermostat means positioned in one end of said well means including first and second contact means normally in closed circuit position with said first contact means terminating in an external electric terminal and said second contact means terminating in a fixed energizing plate facing the open end of said well means and insulated therefrom, said bi-metal element formed in a flat spiral manner for a relatively long thermal path for permitting the said contacts to remain in closed circuit position for a predetermined period of time when the thermostat is subject to an accelerating temperature by the flow of a predetermined electric current therethrough and to remain open for a second predetermined time dependent upon the value of said current and the resistivity of said bi-metal element, a lighter unit adapted and constructed for frictional rotation in said well means for inward movement into contact with said energizing plate and for complete removal for use, said unit having a heater means at the outer end thereof comprising a sheet metal heater cup positioned in coaxial spaced relation with respect to said support member and insulated therefrom by a heat resistant dielectric disc and retained thereon by a central fastener and insulated therefrom by a heat resistant dielectric washer positioned against the inner surface of said cup with said fastener conductively secured to said support member with the rim of said cup providing a circular contact normal the axis of said shell, said cup partially filled with a heat resistant fibrous ceramic insulation, a heater element of metal alloy ribbon of uniform cross section and predetermined resistivity in spaced planar spiral shape with each turn thereof formed at a predetermined conical angle with respect to said axis, said heater element positioned in said cup normal said axis with each said turn imbedded in said fibrous insulation and the inner end thereof connected to said central fastener and the outer end thereof connected to said cup whereby the engagement of said circular contact with said energizing plate will energize said heater unit to a red heat and said bi-metal element to a predetermined temperature at which time the said thermostat will open said first and second contacts and de-energize said heater element and said bi-metal element when said well means and said electric terminal are connected to a predetermined source of electric energy.

8. In a cigar lighter of the character described a heater means comprising a sheet metal cup having a planar bottom surface and a cylindrical rim of uniform width with the edge thereof forming a circular planar contact, said cup partially filled with a heat resistant fibrous ceramic, a heater element formed from electric heater alloy ribbon of predetermined thickness and width and resistivity, said ribbon wound in substantially equi-spaced spiral form with each turn thereof having a predetermined conical angle with respect to the axis of said spiral form, said heater element positioned in said cup in coaxial relation therewith with a portion of the inner side of each turn thereof imbedded in said ceramic whereby said element will resist deformation and displacement when energized from normal ambient to a red temperature.

References Cited
UNITED STATES PATENTS

| | | | |
|---|---|---|---|
| 1,817,027 | 8/1931 | Anderson | 338—218 X |
| 1,881,881 | 10/1932 | Noble | 338—218 X |
| 2,237,250 | 4/1941 | Johnson | 219—269 |
| 2,694,134 | 11/1954 | Youhouse | 338—297 X |
| 2,790,061 | 4/1957 | Youhouse | 219—265 |
| 2,883,510 | 4/1959 | Krautwurst et al. | 219—264 |
| 3,235,707 | 2/1966 | Horwitt | 219—270 |
| 3,238,353 | 3/1966 | Lybrook | 219—265 |
| 3,238,354 | 3/1966 | Lybrook | 219—270 |
| 3,330,937 | 7/1967 | Horwitt | 219—265 |

BERNARD A. GILHEANY, *Primary Examiner.*

VOLODYMYR Y. MAYEWSKY, *Examiner.*